US011826308B2

(12) United States Patent
Zimmermann

(10) Patent No.: US 11,826,308 B2
(45) Date of Patent: Nov. 28, 2023

(54) FILLING DEVICE FOR THE DOSED FILLING OF A LIQUID OR FINE POWDERY PRODUCT FROM A PRODUCT STORAGE CONTAINER INTO PRODUCT DOSE RECEIVING CONTAINERS PROVIDED IN A DISPOSABLE ISOLATOR SO AS TO BE PROTECTED AGAINST CONTAMINATION

(71) Applicant: Bausch + Ströbel Maschinenfabrik Ilshofen GmbH + Co. KG, Ilshofen (DE)

(72) Inventor: Markus Zimmermann, Rot am See (DE)

(73) Assignee: BAUSCH + STRÖBEL MASCHINENFABRIK ILSHOFEN GMBH + CO. KG, Ilshofen (DE)

( * ) Notice: Subject to any disclaimer, the term of this patent is extended or adjusted under 35 U.S.C. 154(b) by 0 days.

(21) Appl. No.: 17/762,511

(22) PCT Filed: Sep. 16, 2020

(86) PCT No.: PCT/EP2020/075795
§ 371 (c)(1),
(2) Date: Mar. 22, 2022

(87) PCT Pub. No.: WO2021/058340
PCT Pub. Date: Apr. 1, 2021

(65) Prior Publication Data
US 2022/0339068 A1 Oct. 27, 2022

(30) Foreign Application Priority Data
Sep. 23, 2019 (DE) ..................... 20 2019 105 251.1

(51) Int. Cl.
*A61J 1/20* (2006.01)
*A61J 1/16* (2023.01)

(52) U.S. Cl.
CPC ............... *A61J 1/2089* (2013.01); *A61J 1/16* (2013.01); *A61J 1/201* (2015.05); *A61J 2200/70* (2013.01); *A61J 2200/74* (2013.01)

(58) Field of Classification Search
CPC ............. A61J 1/2089; A61J 1/16; A61J 1/201
See application file for complete search history.

(56) References Cited

U.S. PATENT DOCUMENTS

2016/0354281 A1* 12/2016 O'Neill ................... B65B 3/003

FOREIGN PATENT DOCUMENTS

DE         19701001 A1      7/1998
DE      102017216366 A1      3/2019
(Continued)

OTHER PUBLICATIONS

German Application No. DE202019105251.1 , "Search Report", dated Jun. 5, 2020, 5 pages.

(Continued)

*Primary Examiner* — Jason K Niesz
(74) *Attorney, Agent, or Firm* — Kilpatrick Townsend & Stockton LLP

(57) ABSTRACT

A filling device for dosed filling of a product from a product storage container into product dose receiving containers provided in a disposable isolator so to be protected against contamination. The device includes means for holding the product storage container together with the contents outside of the disposable isolator. The device includes a controllable product removal device for a dosed removal of the product from the product storage container. The device includes a product dispensing device for the dosed dispensing of the product to the product dose receiving containers. The device includes a line assembly interconnecting the product storage container and the product dispensing device to conduct the product to the product dispensing device. The device (Continued)

includes at least one ultrasonic flowmeter outside of the disposable isolator fixed to the outside of the line assembly to detect the flow rate. The device includes a controller for measuring the product dose.

15 Claims, 1 Drawing Sheet

(56) References Cited

FOREIGN PATENT DOCUMENTS

| | | |
|---|---|---|
| WO | 2010100234 A1 | 9/2010 |
| WO | 2017127586 A1 | 7/2017 |

OTHER PUBLICATIONS

International Application No. PCT/EP2020/075795 , "International Search Report and Written Opinion", dated Dec. 1, 2020, 11 pages.

* cited by examiner

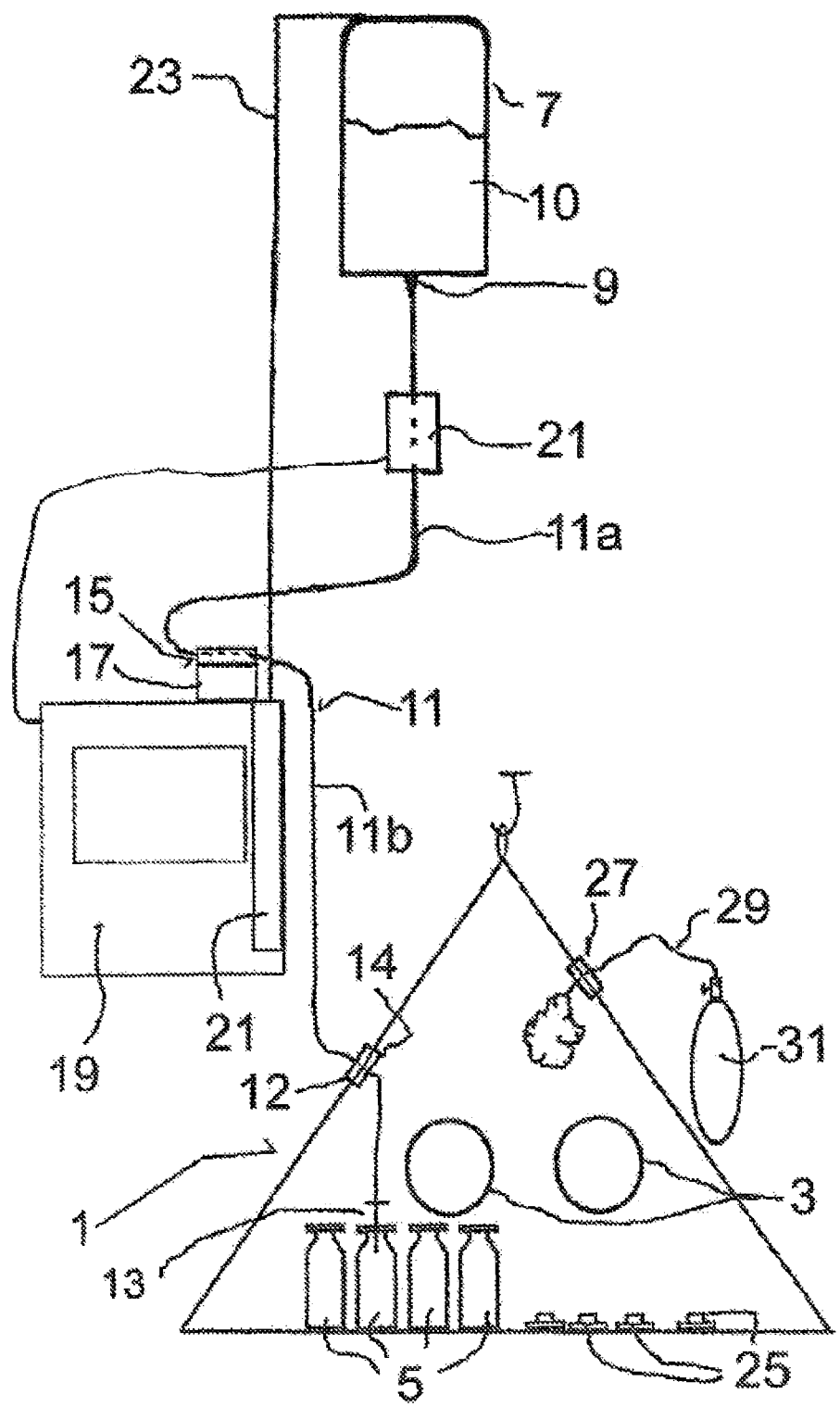

FILLING DEVICE FOR THE DOSED FILLING OF A LIQUID OR FINE POWDERY PRODUCT FROM A PRODUCT STORAGE CONTAINER INTO PRODUCT DOSE RECEIVING CONTAINERS PROVIDED IN A DISPOSABLE ISOLATOR SO AS TO BE PROTECTED AGAINST CONTAMINATION

CROSS REFERENCE TO RELATED APPLICATION

This application is a U.S. national phase of International Patent Application No. PCT/EP2020/075795 filed on Sep. 16, 2020, which claims priority to German Patent Application No. 20 2019 105 251.1, filed in Germany on Sep. 23, 2019. The entire contents of both applications are hereby incorporated herein by this reference.

The field of application of the present invention is in particular the dosed filling of aseptic or toxic substances, for example medicines, into filling containers in a manner that protects the substances to be filled against contamination and prevents the substance to be filled from escaping into the environment.

Prior art filling devices of the type considered here are problematic in that it is difficult to detect the filling quantities as precisely as possible, or laborious measures are required. Weighing the product dose receiving containers located in a corresponding disposable isolator by means of a weighing device provided outside of the disposable isolator during a filling process is difficult and does not provide very reliable results, because a part of the film wall of the disposable isolator between the weighing device and the corresponding product dose receiving containers always interferes with the weighing. In-process control of the filling processes is difficult and imprecise with such a procedure.

Filling devices of the type considered here have also already been discussed in which a weighing device is provided in such a way that a weighing pan or platform of the weighing device is positioned inside the disposable isolator, whereas the rest of the weighing device with operating elements, display device, electronics etc. is arranged outside of the disposable isolator, so that the weighing pan or platform and weighing device can be plugged together in a detachable, functional manner via a sterile sealed plug-in connection in the region of a wall of the disposable isolator. Such an arrangement would thus allow a weighing process in which the film wall of the disposable isolator does not noticeably interfere. The weighing pan should either be cleaned very carefully after the filling process in question has been completed—or disposed of together with the disposable isolator. The weighing device can then be used for further filling processes. Such an approach has also not proven to be advantageously practicable.

The object of the present invention is to provide a filling device for the dosed filling of a liquid or fine powdery product from a product storage container into product dose receiving containers provided in a disposable isolator so as to be protected against contamination, which device, with simple means, enables easily controllable and precise dosing of the respective filling quantities during the filling process without contaminating components of the dose measuring means with the product.

For this purpose, the filling device according to the invention has the following features:

- a disposable isolator together with the product dose receiving containers provided therein,
- means for holding the product storage container together with the contents thereof outside of the disposable isolator,
- a controllable product removal device for the dosed removal of the product from the product storage container outside of the disposable isolator,
- a product dispensing device within the isolator for the dosed dispensing of the product to the relevant product dose receiving containers in the disposable isolator,
- a line assembly which interconnects the product storage container and the product dispensing device in order to conduct the product removed from the product storage container by means of the product removal device to the product dispensing device,
- at least one clamp-on-type ultrasonic flowmeter which is provided outside of the disposable isolator, on the line assembly, and which is fixed to the outside of the line assembly so as to surround at least some regions of the line assembly in order to detect the relevant flow rate, and
- a controller for measuring the relevant product dose to be removed from the product storage container on the basis of information from the flowmeter regarding the flow rate and for controlling the product removal device.

The basic concept of the present invention is thus to determine the respective dose quantities in a simple manner with dose measuring means which are provided completely outside of the disposable isolator and thus protected against contamination with the product. With such a procedure it is possible, with simple means, namely by means of the clamp-on-type ultrasonic flowmeter in connection with the controller, to detect the dose quantities and to precisely set and document said dose quantities by means of the product dispensing device. It is therefore not necessary to clean the dose measuring means or the clamp-on-type ultrasonic flowmeter in a sterile manner after each filling process.

Clamp-on-type ultrasonic flowmeters are known per se. They detect the speed of the medium flowing in the line with the help of acoustic waves. To do this, they do not require any disadvantageous moving mechanical parts and also do not require the cross-section of the line to be narrowed at the measurement site. They are distinguished in particular by the fact that they can be attached, in particular clamped, to the outside of the relevant line in readiness for measurement with very little installation effort. Depending on the choice of ultrasonic flowmeter, two measuring principles which are known per se can be used, namely the ultrasonic Doppler method or the ultrasonic transit time method. The controller determines the relevant dose quantity on the basis of the flow measurement information from the ultrasonic flowmeter integrated over time.

A controllable peristaltic pump is preferably used as the product removal device, which peristaltic pump exerts a squeezing action on a line region of the line assembly provided as a squeeze tube and thereby displaces the product in the squeeze tube in the desired flow direction. The components of the peristaltic pump do not come into direct contact with the product. The peristaltic pump can be controlled by means of the controller so that said peristaltic pump can be started and stopped in order to start and stop a relevant filling process.

The disposable isolator can have, in a manner known per se, a preferably transparent film wall made of a plastics film, which film wall isolates the isolator interior from the external environment so as to be protected against contamination.

Such disposable isolators are relatively inexpensive and can be disposed of safely and in an orderly manner after use.

The disposable isolator preferably has, in a manner known per se, glove intervention means for handling objects inside the disposable isolator, in particular for an operator to handle product dose receiving containers from the outside. The operator can, for example, use the glove intervention means to position the product dose receiving containers in a target filling position relative to the product dispensing device in the disposable isolator and/or, after filling, close the product dose receiving containers in the disposable isolator with stoppers, screw caps or the like.

According to an advantageous development of the invention, the disposable isolator has means for routing the line assembly through the isolator wall in a sterile manner, so that the product can be conveyed by means of the line assembly from the product storage container provided outside of the disposable isolator to the dispensing device provided in the disposable isolator without the risk of contaminating the outer region of the disposable isolator.

The means for routing the line assembly through the isolator wall in a sterile manner can be plug-in connection means which, in the intended plug-in connection state, connect a line portion provided inside the disposable isolator to a line portion leading to the disposable isolator outside thereof in a manner so as to create a sterile seal from the outside. When the plug-in connection is released, the plug-in connection means provided on the disposable isolator seal the transition in a sterile manner.

In a further advantageous embodiment of the invention, the disposable isolator has connection means in its wall for connecting external lines, in particular protective gas lines, for a medium, such as $CO_2$ or nitrogen, or clean air, such as laminar air filtered by filters, e.g. HEPA filters, to be supplied to the interior of the disposable isolator in a manner so as to be protected against contamination. In this case, too, the connection means assigned to the disposable isolator seal in a sterile, tight manner if no external line is connected.

The product dispensing device is preferably a filling needle or, if necessary, a plurality of filling needles, via which the product is introduced into the product dose receiving containers.

The liquid storage container can be, for example, a plastics film bag with a lower connection for the line assembly.

The product dose receiving containers can be, for example, reagent bottles such as medicine bottles, reagent tubes and the like. Closing elements are preferably provided in the disposable isolator for closing the product dose receiving containers so that the filled product dose receiving containers can still be tightly sealed in the disposable isolator before they are removed.

According to a particularly preferred embodiment of the invention, the controller is configured to store a value of the relevant dose quantity per filled product dose receiving container, in particular the detected dose weight, in association with the relevant filled product dose receiving container in order to implement in-process control and thus create the possibility of ongoing monitoring of the quality of the filling processes.

An embodiment of the invention is explained in more detail below with reference to the schematic representation of a filling device according to the invention according to FIG. 1.

In FIG. 1, a disposable isolator is designated with the reference sign 1, which disposable isolator is a type of closed tent with walls made of a transparent plastics film. The disposable isolator has two glove intervention holes 3 to which gloves (not shown) made of a flexible plastics material that extend into the space of the disposable isolator 1 are attached in a sealed manner (glove box principle). An operator can reach into the glove intervention holes 3 in order to then move and handle objects in the disposable isolator 1 using the gloves. A particle counter and/or a germ collector can be provided in the disposable isolator in order to monitor or ensure the cleanroom quality therein.

In the disposable isolator 1 there are small bottles, for example vials, as product dose receiving containers 5, into which a liquid, for example a toxic liquid, is to be filled in doses as the product. Filling processes should be carried out in such a way that the outside of the disposable isolator 1 is not contaminated in any way with the product.

The product is initially located in a product storage container 7 outside of the disposable isolator 1. The product storage container 7 can be, for example, a film bag which has a product outlet 9 on its underside with a line portion 11a of a line assembly 11 connected in a sealing manner to the outside of said product storage container, which line assembly is used to conduct the product from the storage container 7 to the disposable isolator 1 and further therein to a filling needle 13 which serves the function of a product dispensing device within the disposable isolator 1. The line assembly 11 substantially consists of a flexible plastics tube, which is guided at 15 through a peristaltic pump 17 and there forms the squeeze tube portion of the peristaltic pump 17, at which the product material contained therein is driven forward by a squeeze tube process in the target flow direction to the disposable isolator 1. This is followed by a line portion 11b which leads to the disposable isolator 1. The line assembly 11 passes through the wall of the disposable isolator 1 in a sealed manner at 12, for which purpose corresponding means 14 for routing the line assembly 11 through the isolator wall 14 in a sterile manner are provided. Said means can also be plug-in connection means, for example.

The peristaltic pump 17 can be controlled by means of a controller 19, i.e. the peristaltic pump can be started in a targeted manner to advance the product material and stopped to stop the advance movement of the product material, so that in this way dosing of the material conveyed by the peristaltic pump 17 between the pump start and pump stop is possible.

The product storage container 7 is suspended from a support rod 23.

A clamp-on-type ultrasonic flowmeter 21, known per se, is arranged on the line assembly 11 to detect the respective dose quantities. In the example, the ultrasonic flowmeter is attached to the outside of the line portion 11a so as to surround it and is electrically connected to the controller 19 in order to transmit its measurement information. The ultrasonic flowmeter 21 detects the relevant flow rate of the product flowing in the line portion 11a when the product is being dosed and the controller determines the dose quantity of the relevant dose to be filled by integrating the measurement information over time.

A particular filling process can then take place in such a way that the controller 19 starts the filling process by appropriately activating the peristaltic pump and, beginning with the start time, integrates the flow rate measurement information from the ultrasonic flowmeter 21 over time until the controller determines that the desired dose quantity has been reached, in order to then stop the current filling process by activating the peristaltic pump accordingly. In one variant, the ultrasonic flowmeter can optionally already have means for integrating the measurement information over time and thus determine dose quantities.

An operator can then, by reaching into the gloves at 3, close the filled bottle 5 with a stopper 25 held ready in the disposable isolator 1 and, if necessary, bring a next bottle 5 to be filled into position for the filling needle 13, so that this bottle is filled with a product dose during the next filling process.

This can be continued in a corresponding manner until all the bottles 5 have been dosed, filled and sealed.

The controller 19 is configured to store the dose quantity filled in each filled product dose receiving container 5, in particular the dose weight, in association with the each filled product dose receiving container, in order to implement in-process control. In this way it is also possible to easily recognise whether there are any filled product dose receiving containers 5 in which the filling quantity is outside a certain tolerance range. The filling quantity of the product can also be readjusted depending on the dosage. Depending on the result of the monitoring of the filled dose quantities within the tolerance limits, the revolutions of the peristaltic pump can be optimised accordingly.

At 27, the disposable isolator 1 has connection means in its wall for connecting external lines, here a protective gas line 29 to which a relevant protective gas source 31 is connected.

By means of this arrangement, protective gas such as clean air, for example laminar air filtered by filters, e.g. HEPA filters, $CO_2$ or nitrogen can be introduced into the interior of the disposable isolator 1 in order to also generate a certain overpressure therein, which prevents an overflow quantity from escaping from the filling needle 13 after each stop of the peristaltic pump 17.

Further elements can also be provided inside the disposable isolator 1, such as caps and/or appropriate tools, for example disposable pliers and the like.

The invention claimed is:

1. A filling device for a dosed filling of a liquid or fine powdery product from a product storage container into product dose receiving containers provided in a disposable isolator so as to be protected against contamination, the filling device comprising:
    the disposable isolator together with the product dose receiving containers provided therein;
    means for holding the product storage container together with contents of the product storage container outside of the disposable isolator;
    a controllable product removal device for a dosed removal of the product from the product storage container outside of the disposable isolator;
    a product dispensing device within the disposable isolator for the dosed dispensing of the product to the product dose receiving containers in the disposable isolator;
    a line assembly interconnecting the product storage container and the product dispensing device to conduct the product removed from the product storage container by means of the product removal device to the product dispensing device;
    at least one clamp-on-type ultrasonic flowmeter outside of the disposable isolator, on the line assembly, the flowmeter being fixed to an outside of the line assembly to surround at least some regions of the line assembly to detect a relevant flow rate; and
    a controller for measuring a relevant product dose to be removed from the product storage container on the basis of information from the flowmeter regarding the flow rate and for controlling the product removal device.

2. The filling device of claim 1, wherein the product removal device comprises a controllable peristaltic pump.

3. The filling device of claim 1, wherein the disposable isolator has means for routing the line assembly through an isolator wall in a sterile manner.

4. The filling device of claim 1, wherein the product dispensing device comprises a filling needle.

5. The filling device of claim 1, wherein the product storage container comprises a plastics film bag with a lower connection for the line assembly.

6. The filling device of claim 1, wherein the product dose receiving containers are one or more of reagent bottles or medicine bottles.

7. The filling device of claim 1, wherein the disposable isolator comprises closing elements for closing the product dose receiving containers.

8. The filling device of claim 1, wherein the disposable isolator has a film wall made of a plastics film, wherein the film wall isolates the isolator interior from the external environment so as to be protected against contamination.

9. The filling device of claim 8, wherein the film wall is transparent.

10. The filling device of claim 1, wherein the disposable isolator comprises glove intervention means for handling of objects inside the disposable isolator from the outside.

11. The filling device of claim 10, wherein the objects comprise the product dose receiving containers.

12. The filling device of claim 1, wherein the disposable isolator comprises connection means in a wall of the disposable isolator for connecting external lines for a medium to be supplied to an interior of the disposable isolator in a manner so as to be protected against contamination.

13. The filling device of claim 12, wherein the connecting external lines comprise protective gas lines.

14. The filling device of claim 1, wherein the controller is configured to store a value of a relevant dose quantity per filled product dose receiving container in association with the respective filled product dose receiving containers to implement in-process control.

15. The filling device of claim 14, wherein the value comprises a detected dose weight.

* * * * *